Patented Jan. 10, 1939

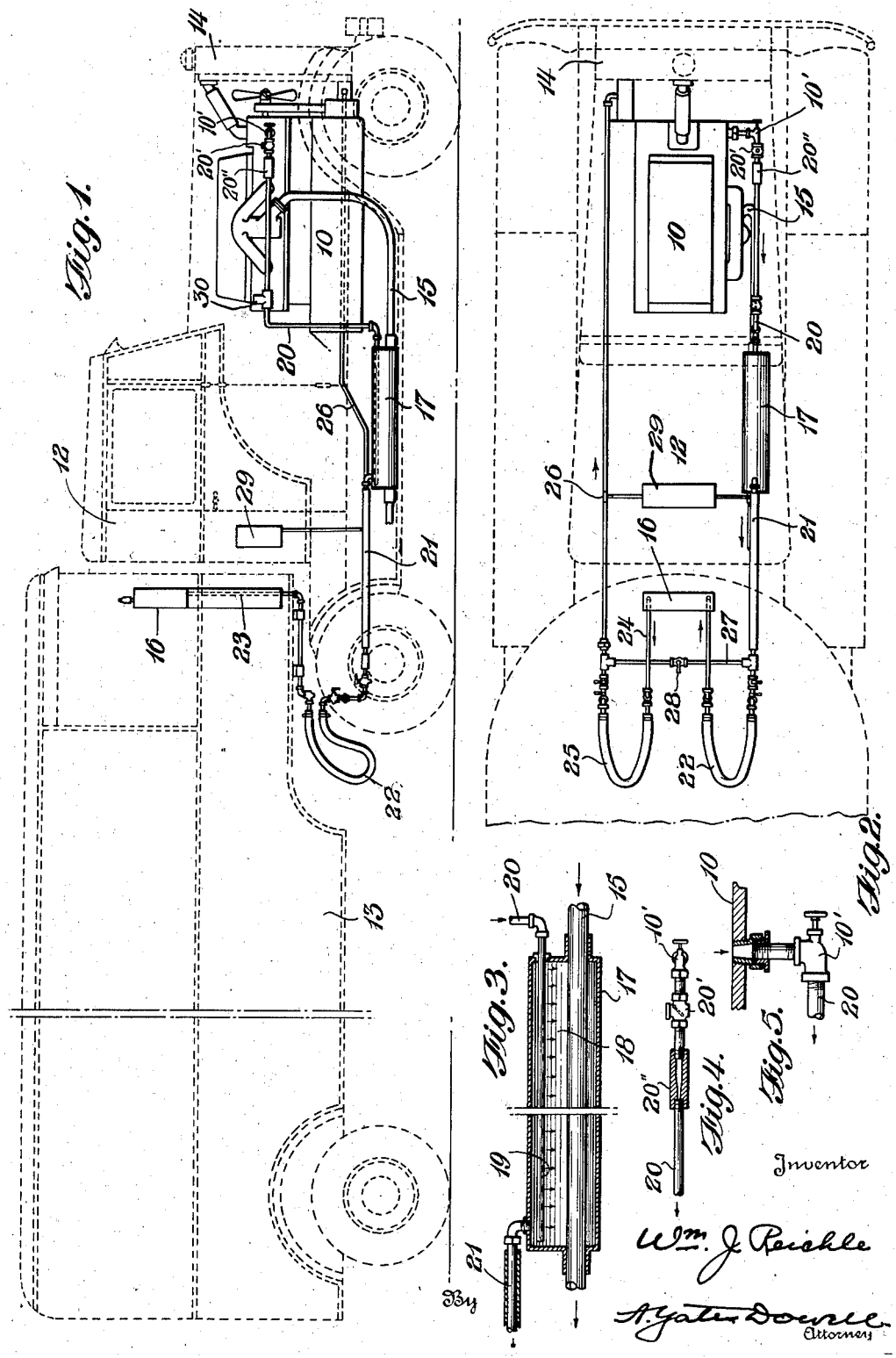

2,143,212

UNITED STATES PATENT OFFICE 2,143,212

HEATER INSTALLATION FOR MOTOR VEHICLES

William Joseph Reichle, Cincinnati, Ohio

Application April 10, 1936, Serial No. 73,772

2 Claims. (Cl. 237—12.3)

This invention relates to heating systems for motor vehicles, and is particularly adapted for installation in connection with trucks and trailers used for hauling produce to prevent the latter from being subjected to damaging temperatures during the winter season. In such vehicles it is generally necessary to locate the heater a relatively great distance from the power plant, with the result that considerable heat loss takes place during conduction of the heating agent to the point where the heater may be located. The provision of a satisfactory heater for vehicles of this type presents the foregoing as well as certain other problems which have been satisfactorily solved by the present improved system.

It is an object of the present invention, therefore, to provide a closed or sealed circulatory heating system or apparatus which is particularly suitable for installations such as those above noted; to provide heating apparatus for a truck or trailer body wherein the heating device or radiator may be readily located at the most effective point to obtain uniform heat distribution throughout the compartment to be heated and with a minimum loss of heat during conduction of the heating element to the heater; and to provide a simplified and highly efficient type of heating apparatus for trailer bodies embodying a heat exchange device or radiator which may be permanently installed in the trailer or truck body and which may be quickly and easily connected and disconnected with respect to the remainder of the system with a minimum loss of cooling fluid from the cooling system from which it is taken.

With the foregoing and other objects and advantages in view, the invention consists in the preferred construction and arrangement of parts which will be more fully hereinafter described and claimed.

In the drawing:

Fig. 1 is a side elevation of a truck and trailer shown in dotted lines with the improved heating system operatively installed in connection therewith.

Fig. 2 is a plan view of the system or apparatus.

Fig. 3 is a detail view in longitudinal section of a preferred type of steam generator; and Figs. 4 and 5 are detail views of parts of the apparatus.

Referring to the drawing in detail, the power plant or engine is generally indicated at 10, the truck cab at 12, the trailer body at 13, the radiator which forms part of the cooling system at 14, and the exhaust pipe for the engine at 15.

The preferred type of generator or vaporizer consists of a drum 17 which is mounted on the exhaust manifold 15, said drum defining a sealed chamber 18 which is heated by the exhaust pipe. Water or fluid from the cooling system is shown as being taken from the engine block through the medium of a pipe line 20 having installed therein adjacent the block a water control valve 10′, and also a check valve 20′, the latter preventing back pressure into the cooling system. A coupling 20″ formed with a reduced orifice of a size such as will limit the water taken from the system to the desired quantity is also installed in the water supply line 20, the latter leading to the steam generator and terminating in a drip pipe 19 which extends into the generator chamber 18 and is formed with a plurality of holes which permit the water to drip onto the exhaust pipe and be vaporized or converted into steam. The drip holes in the discharge extremity of the pipe 20 are preferably smaller at the entrance than at the rear end of the pipe, or graduate in size from the entrance to the rear to effect a more even drip of the water onto the exhaust pipe.

From the vaporizing or generator chamber 18, the steam is conducted through a line 21, which is preferably insulated to avoid condensation, to a flexible hose coupling 22 and thence through pipe 23 to the radiator or heat exchange device generally indicated at 16 and which may be of any preferred type. The radiator 16 is shown located near the top of the trailer body and above the level of the inlet to the cooling system, so that a more even distribution of heat throughout the body is effected and the condensed steam or water will more readily drain and pass back to the said system.

The return line from the radiator or heater 16 is made up of the pipe 24, the flexible coupling 25, and the pipe 26, the latter leading back to a suitable point in the cooling system.

Connected between the pipes 21 and 26 is a pipe line which has installed therein an additional radiator or heater 29, the latter being positioned in the cab of the truck to heat the latter. A by-pass line 27 also connects the pipes 21 and 26, and beyond this by-pass line 27 are valves which may be closed when it is desired to shut the steam off from the heater 16 and disconnect the trailer from the truck.

A solenoid valve 30 is preferably provided in the line 20 and is connected into the electrical system of the vehicle in a manner such that when the heater switch, (not shown) is turned off, the line 20 will be closed so that water will be prevented from accumulating in the lines when the system is not in use.

From the foregoing it will be seen that a definite quantity of water may be taken from the cooling system and fed to the generator 17, the steam from the latter passing into the heater or radiator 16, where it condenses in whole or in part and then passes back into the cooling system. The system readily accommodates the dual heaters 16 and 29. It will be noted that a trailer or truck body may be readily equipped with a heater at any desired point therein and that the arrangement of parts is such that the steam may be generated at a point relatively close to the heater, with a resultant minimum loss of heat during conduction of the steam to the heater. I have found with the improved system that due to the effective coupling arrangement very little solution is lost during the coupling and uncoupling operations.

It will be understood that certain minor changes in the construction and arrangement of parts may be adopted within the scope of the invention as defined by the appended claims.

I claim:

1. A heating system for a truck with a trailer attached thereto and having a compartment to be heated comprising, in combination with a fluid-circulating motor cooling system and an exhaust pipe for said motor, a drum operatively associated with said exhaust pipe and defining a vaporizing chamber, means for conducting a predetermined quantity of water from the cooling system to said chamber, a heat exchange device located in the trailer compartment, a pipe line connecting said drum with said device and having flexible connections therein, a return pipe connection between said device and the cooling system, a valve-controlled by-pass spanning said pipe lines and coacting shut-off valves in said latter lines in rear of said by-pass for closing off the said device from the remainder of the heating system when the trailer is to be detached from the truck.

2. A heating system for a truck having a trailer attached thereto and provided with a compartment to be heated comprising, in combination with a motor and cooling system therefor and an exhaust pipe for said motor, a steam generator operatively associated with said exhaust pipe, means for conducting water from the cooling system to the generator to be converted into steam, a heat exchange device or radiator located in the trailer compartment, a steam line leading from said generator to said radiator and a return line leading from said radiator back to the cooling system, flexible connections in said lines, a pipe connection communicating said lines, a separate heat exchange device or radiator operatively interposed in said pipe connection and adapted to be positioned in a cab or like compartment of the truck to which the trailer may be attached, a valve-controlled by-pass spanning the said steam and return lines and said latter lines being provided with shut-off valves in rear of said by-pass whereby when the trailer is detached from the truck the heating steam for the latter may be directed through a closed cycle.

WILLIAM JOSEPH REICHLE.